United States Patent [19]

Brininstool et al.

[11] Patent Number: 4,725,728
[45] Date of Patent: Feb. 16, 1988

[54] FIBER OPTICAL TIME DELAY RESONANT OSCILLATING STRAIN GAUGE

[75] Inventors: Michael R. Brininstool; Graham A. Garcia, both of San Diego, Calif.

[73] Assignee: The United States of America as represented by the Secretary of the Navy, Washington, D.C.

[21] Appl. No.: 896,164

[22] Filed: Aug. 13, 1986

[51] Int. Cl.[4] .................................................. G01L 1/24
[52] U.S. Cl. ................................... 250/227; 250/231 P; 73/800; 356/32
[58] Field of Search ............................ 250/227, 231 P; 331/155; 356/32; 73/705, 800, DIG. 11, 862.38; 350/96.15

[56] References Cited

U.S. PATENT DOCUMENTS

| 4,136,929 | 1/1979 | Suzaki | 350/96.15 |
| 4,577,100 | 3/1986 | Meltz et al. | 250/227 |
| 4,651,571 | 3/1987 | McGlade | 250/227 |

FOREIGN PATENT DOCUMENTS

| 0063403 | 4/1985 | Japan | 356/32 |
| 2145514 | 3/1985 | United Kingdom | 356/32 |

Primary Examiner—Edward P. Westin
Assistant Examiner—Charles Wieland
Attorney, Agent, or Firm—Ervin F. Johnston; Thomas G. Keough

[57] ABSTRACT

Longitudinal tensile and/or compressive strain in optical fibers is determined by an entirely optical technique. A test optical fiber optically coupled to optical injection and extraction couplers form an optically recirculating loop. A semiconductor laser diode feeds a series of narrow light pulses into the loop via the injection coupler and an oscilloscope or signal peak detector give visual indications of optical correlation when an avalanche photodiode provides responsive signals coming from the extraction coupler. Straining the optical test fiber will change the loop's length and, hence, the time delay between reoccurring pulses so that the loop frequency of the narrow optical pulses must be correspondingly changed to provide maximum signal correlation. Changing the pulse repetition rate of the laser diode until a maximum correlated signal is observed at the scope or detector provides a new resonant loop frequency that is proportional to strain. Stresses in the optical fiber due to temperature, pressure, installation, etc. can thereby be noted. Because the system employs an optical technique for measuring strain, errors which might otherwise be due to electronic time delay variations and drift are eliminated.

12 Claims, 2 Drawing Figures

FIBER OPTICAL TIME DELAY RESONANT OSCILLATING STRAIN GAUGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Optical fibers are being used widely in an ever increasing number of applications. Frequently, the fibers are subjected to a variety of stresses due to temperature and pressure changes, installation stress and the like. All of these can and do affect to one degree or another the fiber's characteristics and consequently, transmitted information validity. Strains have long been known to affect a fiber's lifetime since microcracks and catastrophic failure are more likely to occur where fibers are strained. Obviously, a means for determining such strain would be most helpful to the designer and technician to assure the long life and reliability of optical fibers.

Previous methods for measuring strain include directly measuring the change in time delay of an optical pulse transiting the fiber by means of a time delay generator and a sampling oscilloscope. This approach is dependent upon accuracy and stability of electronics and requires substantial capital equipment investments. Another approach uses electronic pulse regeneration circuitry to retransmit an optical signal, creating an electro-optical closed-loop oscillator. A consequence of this approach is that it is highly dependent on time delay variations in the electronic regeneration portion of the loop. Any changes in delay caused by strain in the fiber are compromised by the inherent instability and drift of the electronic components so that reliable indications of strain are difficult to obtain.

Thus, there is a continuing need in the state of the art for an optical fiber strain measuring device that relies on optical means for measuring longitudinal strain and avoids the time delay variations associated with electronic regeneration circuitry.

SUMMARY OF THE INVENTION

The present invention is directed to providing an apparatus and method for optically measuring the longitudinal strain in a test optical fiber. A laser source generating a series of narrow light pulses is coupled to a means for optically injecting the narrow light pulses into the test optical fiber. A means for optically extracting transmitted narrow light pulses from the test optical fiber is optically coupled to the optically injecting means and together with the test fiber form a recirculating optical loop. A correlation indication providing means is joined to the optically extracting means and gives an indication of maximum correlation when the recirculating optical pulses are at the loop frequency. As the fiber is strained and the fiber's length changes, a different resonant loop frequency is created that is proportional to the strain on the test optical fiber. Changing the frequency of the source of the new loop frequency where maximum correlation occurs, give a strain indication. Selecting the optically injecting means and the optically extracting means to have coupling ratios in the neighborhood of fifteen to one retains sequential recirculated light pulses within the same order of magnitude so as to provide satisfactory correlation resolution.

The method of testing longitudinal strain in at least a portion of a test optical fiber formed as part of an optical loop includes the providing of a series of narrow optical pulses and the optically injecting of the narrow pulses into the test optical fiber. Recirculating the narrow light pulses through the fiber in the optical loop and optically extracting transmitted recirculated narrow light pulses from the test fiber provide for a correlation indication of the recirculating narrow light pulses and a consequent indication of strain in the fiber.

The prime object of the invention is to provide an optical means for measuring longitudinal tensile or compressive strain in an optical fiber.

Another object is to provide for a means that optically indicates strain in an optical fiber due to temperature and pressure changes, as well as installation stresses etc.

Yet another object is to provide for an optical strain indicating means for an optical fiber that recirculates optical pulses for correlation and indication of a level of strain.

Still another object is to provide for an apparatus and method having the capability for indicating strain in an optical fiber that lends itself to in-situ applications.

Yet a further object is to provide for an optical strain indicating means that eliminates the errors associated with electronic time delay variations and drift.

Still yet another object of the invention is to provide for an optical means for determining strain that depends on loop frequency and the change in loop frequency that depends on the change in optical path length of a fiber under test.

These and other objects of the invention will become more readily apparent from the ensuing specification when taken in conjunction with the drawings and the appended claims.

DESCRIPTION OF THE PREFERRED EMBODIMENTS

Figure 1:
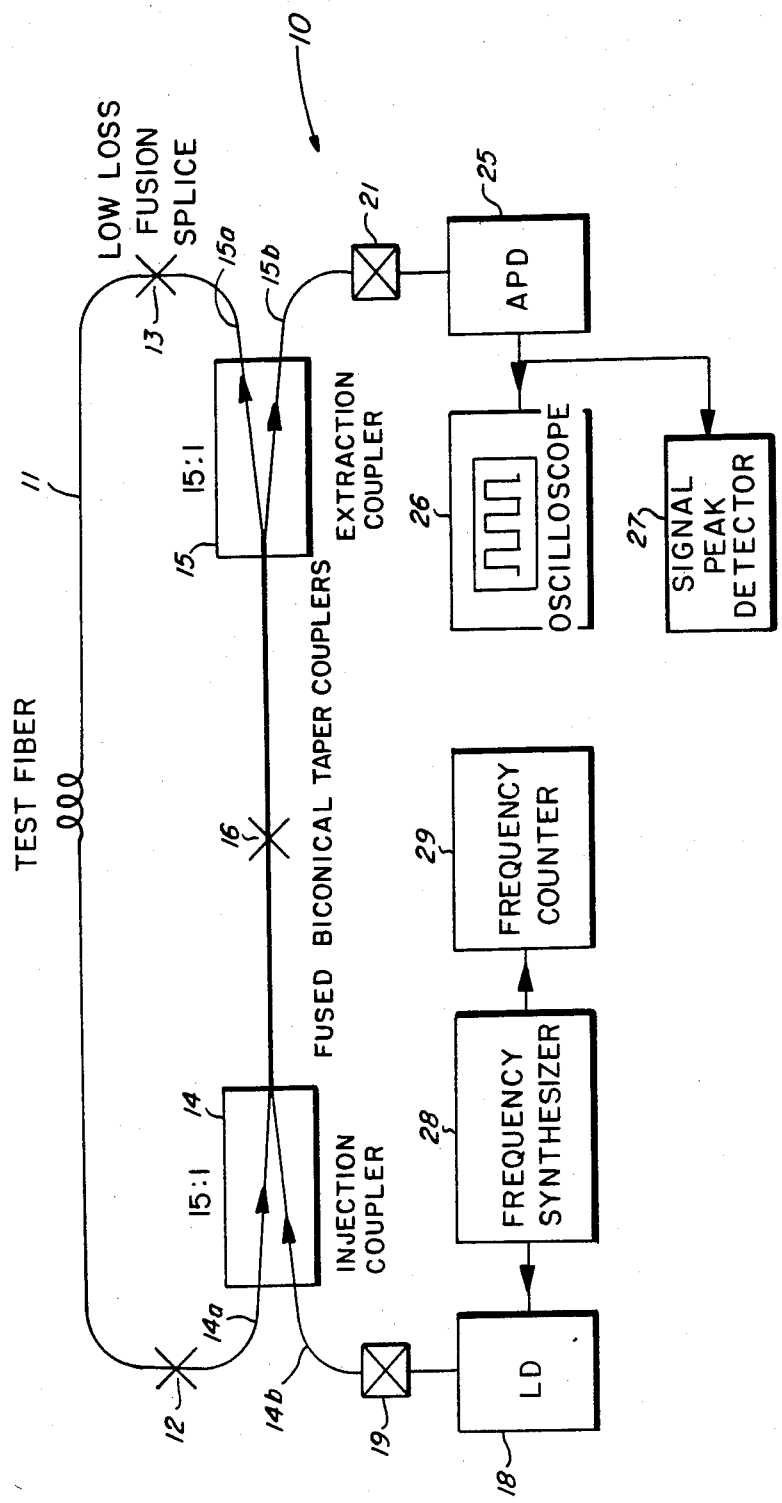
FIG. 1 is a block diagram representation of the principle constituents of the invention for optically determining strain in a test optical fiber.

Referring now to FIG. 1 of the drawings, a block diagram of a resonant strain gauge 10 is depicted as being operatively connected to an optical fiber 11 to be tested for strain. The fiber, a multi-mode or single mode fiber by itself or as part of an optical fiber cable, is connected to the resonant strain gauge at its opposite ends by a pair of low loss fusion splices 12 and 13. When fusion splices are chosen at 12 and 13 as well as others to be identified below, a fusion welder marketed by Power Technology of Little Rock, Ark. as a model PFS310 and suitably employed by a technician can effect the fusion splice in a manner well established in the state of the art.

Fusion welded splices or an equivalent means are selected to provide the lowest possible optical loss at the splice interface between the test fiber and a recirculating coupling 14a of an injection coupler 14 and a recirculating coupling 15a of an extraction coupler 15. These two couplers are fusion welded together at a fusion splice 16 to form an optically closed loop that includes the optical fiber under test, the injection coupler and the extraction coupler.

The injection coupler and extraction coupler are fused biconical taper couplers of the type manufactured by Lanstar Communications of Scarborough of Ontario, Canada as their model TC3-A. While various coupling ratios can be selected from the variety of models available by Canstar, couplers having splitting ratios of 15:1 were selected for this application. This selection was chosen to give an acceptable trade-off between throughput loss and signal injection/extraction efficiency.

One resonant strain gauge fabricated in accordance with the teachings of this invention had roughly 3 db of loss per pulses circulation in the closed loop. Most of the loss was due to the 15:1 couplers 14 and 15, each accounting for about 1.2 db. These two couplers were selected so that the initial pulse to be detected by elements to be described would be of the same order of magnitude as pulses which make a multi-pass through the closed loop.

An injection laser diode 18 is joined to an injection coupling 14b of injection coupler 14 via a fusion splice or optical connector 19. The laser diode may be a model QLM-1300 marketed by Lasertron of Burlington, MA. Optical connector 19 may be a model 8304 marketed by Deutsch of Banning, Calif. A similar connector 21 can be used to join an extraction coupling 15b of extraction coupler 15 to an avalanche photodiode 25.

The avalanche photodetector 25 selected in this application is a model FPD13R121T marketed by Fujitsu of Santa Clara. Calif. This unit responded to produce a representative electrical output signal for an oscilloscope 26, signal peak detector 27 or the like for indicating a maximum correlation of recirculating light pulses. The wide variety of oscilloscopes and signal peak detectors, such as a Tektronics 2465 etc could be used in a manner which is well known to those skilled in this particular art.

A frequency synthesizer 28 actuates laser diode 18 in accordance with a desired signal and a frequency counter 29 provides representative read-out. A typical pulse generator/synthesizer is marketed by Hewlett-Packard Corp. of Palo Alto, Calif. as its model 3325A Synth/Func Generator and a typical frequency counter is a model 5612 commercially available by DSI Instruments of San Diego, Calif.

With the aforedescribed elements of the resonant strain gauge, longitudinal strain, compressive or tensile, can be determined. Resonant strain gauge 10 is used to indirectly measure the strain on test fiber 11 by measuring the change in transient time of an optical pulse traveling through the fiber and relating it to the change in optical path length or longitudinal strain. Laser diode 18 emits a series of narrow, five nanosecond or less, optical pulses at an initial loop frequency. Coupling 14b of injection coupler 14 injects these pulses into the optical loop formed of couplers 14, 15, splices 12, 13 and 16 and test fiber 11. The pulse is allowed to make successive passes around the optical loop via recirculating couplings 14a and 15a of the injection and extraction couplers 14 and 15. An extraction coupling 15b of extraction coupler 15 extracts a small fraction (approximately five percent) of the pulses as they pass through extraction coupler 15 and directs the extracted fraction to avalanche photodiode 25.

Because the optical loop is not one hundred percent transmissive due to the attenuation of test fiber 11 and losses at the splices and couplers, the output of avalanche photodiode 25 is a decaying oscillation. The frequency of the oscillation is equal to the inverse of the loop transient time. By measuring the change in the loop frequency due to strain, the change in loop transient time and ultimately the optical strain can be determined.

To measure the initial loop frequency as well as the loop frequency when the fiber is under strain, laser diode 18 is driven by frequency synthesizer 28. The laser pulse repetition frequency is then tuned by selective adjustment of frequency synthesizer 28 until a sharp signal peak signal is provided at the output of avalanche photodiode 25 and displayed on oscilloscope 26 or signal peak detector 27. This peak occurs at the optical resonant frequency of the loop when a given pulse and all of the multi-pass components from previously launched pulses arrive at the avalanche photodiode detector simultaneously.

The condition is similar to electronic resonance since the peak occurs when the input pulse repetition frequency equals the loop frequency. The loop frequency is read from frequency counter 29 which is connected to the frequency synthesizer 28. As the fiber is strained resonant strain gauge 10 is returned to the new loop frequency and the change is noted on frequency counter 29. Indications of the new retuned resonance are verified by noting the peak condition indicated by oscilloscope 26 or signal peak detector 27.

Strain-induced time delay change as a function of loop frequency change is given as:

$$\Delta \tau = \frac{f_0 - f_1}{f_0 f_1} \approx \frac{\Delta f}{f_0^2}$$

where,
$\Delta \tau$ is transit time change in fiber loop
$f_o$ is initial loop frequency
$f_1$ is new loop frequency
and
$\Delta f$ is change in loop frequency due to strain.

Fiber strain, or elongation per unit length, is found from the expression relating transit time change $\Delta \tau$ to elongation;

$$\frac{\Delta \tau}{\Delta L} = \frac{N}{c}\left(1 + \frac{L}{N}\frac{dN}{dL}\right)$$

where,
N is the effective group refractive index of the fiber under test
c is the speed of light in a vacuum
L is the length of fiber under test, or gauge length, and
dN/dL is the chage in refractive index due to fiber elongation.

Thus, from the foregoing, the resonant strain gauge of the embodiment of FIG. 1 can measure strain in a multimode or single mode fiber after it has been placed in an optical cabling for example. A meaurement of the same length of fiber before and after optical cabling will indicate what stresses the fiber is subjected to after the optical cabling fabrication process. This allows designers to change the procedures if excessive strains are present which might compromise a fiber's utility.

Figure 2:
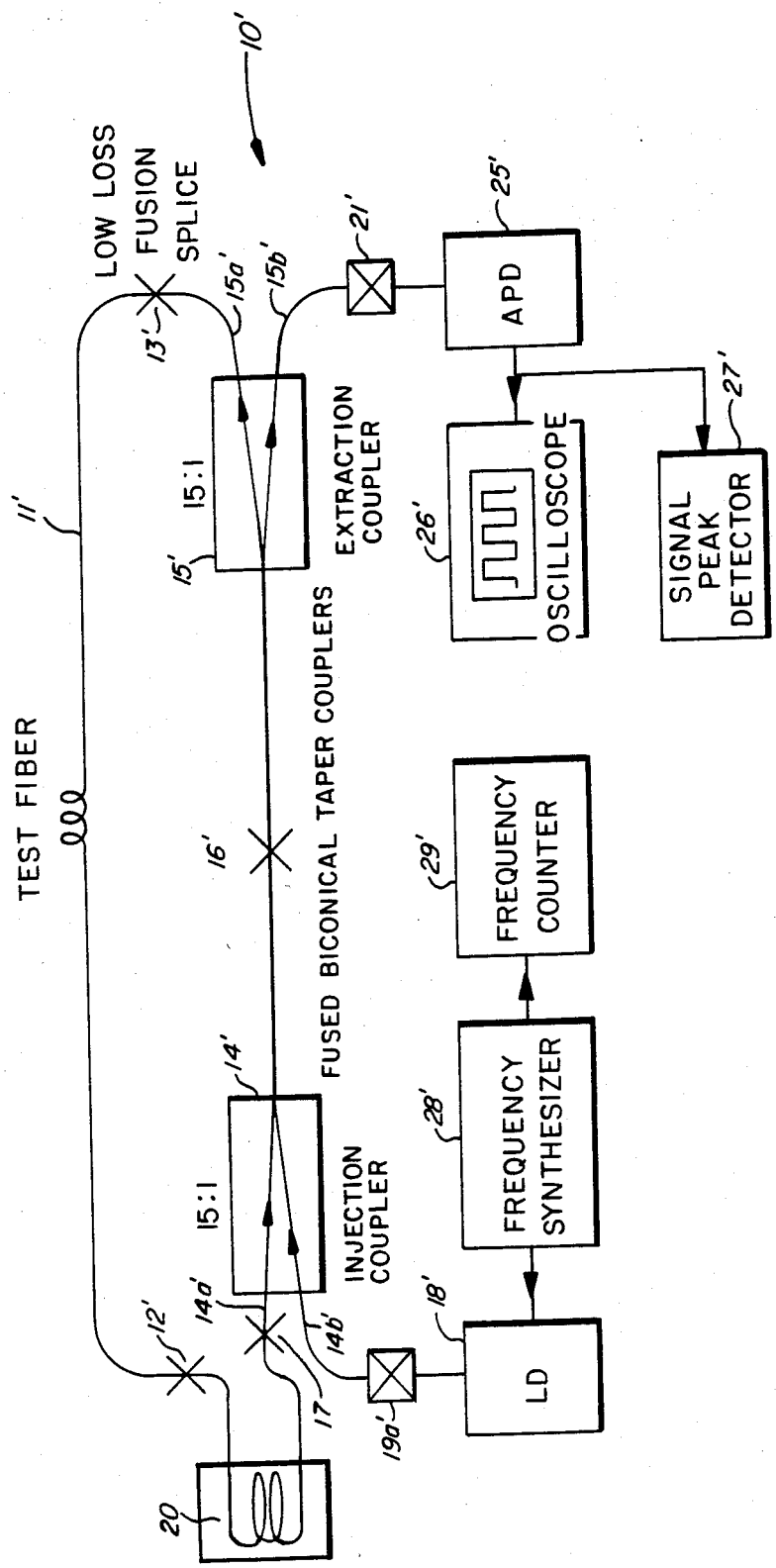
FIG. 2 shows a variation of the resonant strain gauge.

FIG. 2 depicts a variation 10' of the resonant strain gauge in which like elements have primed identical reference characters. Exceptions to the embodiment of FIG. 1 are the inclusion of another fusion splice 27 and a coil of reference fiber 20. In one application test optical fiber 11' is matched as nearly as practicable in length and fiber parameters to the length of coil 20. This enables coil 20 to extend, for example, from one end to the other of optical test fiber 11' for an initial unstrained loop resonant frequency determination and a later strained loop resonant frequency determination without being subjected to the same strain medium as is fiber 11' after fiber 11' has been installed in its stress producing use. Thus, fiber 11' can be tested in its operational environment without disturbing the fiber or the supporting structures. The build up of strains in fiber 11' which might shorten its useful life or impede its transmission can be detected over a period of time by merely recoupling resonant strain gauge 10' that includes coil 20.

The embodiment of FIG. 2 also provides for a combined length of fiber 11' and fiber 20 that represents a single continuous fiber which has had its loop frequency determined by resonant strain gauge 10'. The section of the total test fiber representd by fiber 11' is fabricated into an optical cable or it is placed in a working environment where temperature, pressure and the like effect a strain. The length of fiber 20, strain producing influences serve to couple the test fiber to strain gauge 10' for a subsequent determination of strain so that appropriate corrective measures can be taken.

Of great advantage in this inventive concept as exemplified above is the elimination of instabilities and errors which are due to electrode drift and fluctuations normally associated with conventional fiber strain determining devices. Such errors are not introduced into the disclosed optical recirculating path from which correlation is determined. After multi-passes through the closed optical loop correlation is indicated on an oscilloscope or signal peak detector. The loop frequency and the change in loop frequency is completely dependent on the change in path length of the fiber under test and is, therefore, very accurate.

Obviously, many modifications and variations of the present invention are possible in the light of the above teachings. It is therefore to be understood that within the scope of the appended claims the invention may be practiced otherwise than as specifically described.

What is claimed is:

1. An apparatus for optically measuring longitudinal strain in at least a portion of a test optical fiber comprising:
   a source of a series of narrow light pulses;
   means having an injection coupling optically connected to the source for optically injecting the narrow light pulses into the test optical fiber;
   means having an extraction coupling for optically extracting transmitted narrow light pulses from the test optical fiber, the optically extracting means being optically connected to the optically injecting means and the optically extracting means and the optically injecting means each having a recirculating coupling each connected at opposite ends of the test optical fiber to form a recirculating loop for recirculating injected narrow light pulses through the test optical fiber; and
   means coupled to the first optical coupling of the extracting means for providing a correlation indication of loop frequency of the recirculatng injected narrow light pulses, the frequency of which thereby indicating total strain in the test optical fiber.

2. An apparatus according to claim 1 in which the source of a series of narrow light pulses include a laser diode actuated by a frequency synthesizer to produce the series of narrow light pulses at a resonant loop frequency having a delay between sequential pulses that is equal to the transit time of the recirculating loop.

3. An apparatus according to claim 2 in which the correlation indication providing means includes an avalanche photodiode connected to a visual indicator of frequency correlation that displays when the time delays of the recirculating loop corresponds to the time delay between the series of narrow light pulses of the source.

4. An apparatus according to claim 3 in which the source of a series of narrow light pulses has a frequency counter giving an indication of changing loop frequency and consequent changing strain on the test optical fiber as the test optical fiber undergoes strain.

5. An apparatus according to claim 4 in which the optically injecting means and the optically extracting means are two optical couplers having coupling ratios of 15:1 between their respective couplings to retain sequential recirculated light pulses within the same order of magnitude.

6. An apparatus according to claim 5 further including:
   a reference fiber having a known optical pulse transit time and substantially the same length as the test optical fiber connected between an end of the test optical fiber and the recirculating coupling of one of the optical couplers to enable an in situ testing of strain in the test optic fiber.

7. An apparatus according to claim 1 further including:
   a reference fiber having a known optical pulse transit time and substantially the same length as the test optical fiber connected between an end of the test optical fiber and the recirculating coupling of one of the optical couplers to enable an in situ testing of strain in the test optic fiber.

8. An apparatus according to claim 1 further including:
   a reference fiber section integrally extending with the test optical fiber connected between an end of the test optical fiber and the recirculating coupling of one of the optical couplers to enable an insitu testing of strain in the test optic fiber.

9. A method of testing longitudinal strain in at least a portion of a test optical fiber forming part of an optical loop comprising:
   providing a series of narrow optical pulses;
   optically injecting the narrow light pulses into the test optical fiber;
   recirculating narrow light pulses through the fiber in an optical loop including the test fiber and an injection coupler and an extraction coupler;
   optically extracting recirculated narrow light pulses from the test optical fiber, the steps of optically injecting and optically extracting each include the providing of optical couplers having about a 15:1 coupling ratio to retain sequential recirculated light pulses within the same order magnitude;
   providing a correlation indication of the recirculating narrow light pulses and thus the loop resonant frequency, the providing of an indication showing a change of resonant loop frequency and consequent strain as the test optical fiber undergoes strain; and changing the frequency of the narrow optical pulses to provide a correlation indication as strain changes in the test optical fiber.

10. A method according to claim 9 which the recirculated light pulses avoid electronic processing until a single said correlation indication.

11. A method according to claim 10 further includes: coupling a reference fiber length onto the test fiber to enable the determination of a combined length loop resonant frequency before and after the test optical fiber undergoes strain to determine the level of strain on the test optical fiber.

12. A method according to claim 9 further includes: coupling a reference fiber length onto the test fiber to enable the determination of a combined length loop resonant frequency before and after the test optical fiber undergoes strain to determine the level of strain on the test optical fiber.

* * * * *